United States Patent
Ferguson et al.

(10) Patent No.: US 12,197,502 B2
(45) Date of Patent: Jan. 14, 2025

(54) METHODS FOR GENERATING METADATA BASED ON DATA OBTAINED FROM ONE OR MORE CONNECTED DEVICES

(71) Applicant: Hubbell Incorporated, Shelton, CT (US)

(72) Inventors: Eric Lee Ferguson, Simsbury, CT (US); David Edward Davis, West Hartford, CT (US)

(73) Assignee: Hubbell Incorporated, Shelton, CT (US)

( * ) Notice: Subject to any disclaimer, the term of this patent is extended or adjusted under 35 U.S.C. 154(b) by 354 days.

(21) Appl. No.: 17/765,995

(22) PCT Filed: Oct. 2, 2020

(86) PCT No.: PCT/US2020/054040
§ 371 (c)(1),
(2) Date: Apr. 1, 2022

(87) PCT Pub. No.: WO2021/067778
PCT Pub. Date: Apr. 8, 2021

(65) Prior Publication Data
US 2022/0374471 A1  Nov. 24, 2022

Related U.S. Application Data

(60) Provisional application No. 62/909,848, filed on Oct. 3, 2019.

(51) Int. Cl.
*G06F 16/783* (2019.01)
*G06F 16/78* (2019.01)
(Continued)

(52) U.S. Cl.
CPC ........ *G06F 16/784* (2019.01); *G06F 16/7867* (2019.01); *G06F 16/787* (2019.01);
(Continued)

(58) Field of Classification Search
CPC .. G06F 16/784; G06F 16/7867; G06F 16/787; G06F 16/9537; G06T 7/73; G06T 2207/10016; G06T 2207/30196
(Continued)

(56) References Cited

U.S. PATENT DOCUMENTS

2019/0354776 A1* 11/2019 Ribeiro ............ G08B 13/19695
2020/0162701 A1*  5/2020 Nixon ................... H04N 7/188

OTHER PUBLICATIONS

PCT/US2020/054040 International Search Report and Written Opinion dated Jan. 26, 2021.

* cited by examiner

Primary Examiner — Huy C Ho
(74) Attorney, Agent, or Firm — Robinson + Cole LLP

(57) ABSTRACT

The present disclosure is directed to a method for determining a location of a person or object within a space. The method includes obtaining, by one or more computing device, data from one or more sensor devices associated with one or more connected devices located within the space. The method further includes generating, by the one or more computing devices, metadata indicative of presence of the person or object within the space based, at least in part, on the data. The method further includes obtaining, by the one or more computing device, data indicative of a user request associated with obtaining a location of the person or object within the space. The method further includes determining, by, the one or more computing devices, the location of the person or object based, at least in part, on the metadata.

20 Claims, 8 Drawing Sheets

(51) Int. Cl.
*G06F 16/787* (2019.01)
*G06T 7/73* (2017.01)

(52) U.S. Cl.
CPC ...... *G06T 7/73* (2017.01); *G06T 2207/10016* (2013.01); *G06T 2207/30196* (2013.01)

(58) Field of Classification Search
USPC .......................................................... 382/103
See application file for complete search history.

METHODS FOR GENERATING METADATA BASED ON DATA OBTAINED FROM ONE OR MORE CONNECTED DEVICES

RELATED APPLICATIONS

This application claims priority to U.S. Provisional Application No. 62/909,848, filed Oct. 3, 2019, the disclosures of which are incorporated herein by reference in their entirety and to which priority is claimed.

FIELD

The present disclosure relates generally to methods for generating metadata based on data obtained from one or more sensor devices associated with one or more connected devices located throughout a space.

BACKGROUND

With the advance of Internet of Things (IoT) technology, a space (e.g., office, home, etc.) can be outfitted with various types of connected devices (e.g., thermostat, power switch). These connected devices can include one or more sensor devices (e.g., microphones, motion sensors, etc.) capable of collecting data indicative of activity within the space. For instance, the one or more sensor devices can include one or more motion sensors configured to obtain data indicative of movement of a person within the space. Alternatively or additionally, the one or more sensor devices can include one or more microphones configured to obtain audio data indicative of presence of the person within the space.

SUMMARY

Aspects and advantages of embodiments of the present disclosure will be set forth in part in the following description, or may be learned from the description, or may be learned through practice of the embodiments.

In one aspect, the present disclosure is directed to a method for determining a location of a person or object within a space. The method can include obtaining, by one or more computing device, data from one or more sensor devices associated with one or more connected devices located within the space. In addition, the method can include generating, by the one or more computing devices, metadata indicative of presence of the person or object within the space based, at least in part, on the data. The method can further include obtaining, by the one or more computing device, data indicative of a user request associated with obtaining a location of the person or object within the space. In addition, the method can include determining, by the one or more computing devices, the location of the person or object based, at least in part, on the metadata. Furthermore, the method can include providing, by the one or more computing devices, a notification indicative of the location of the person or object.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
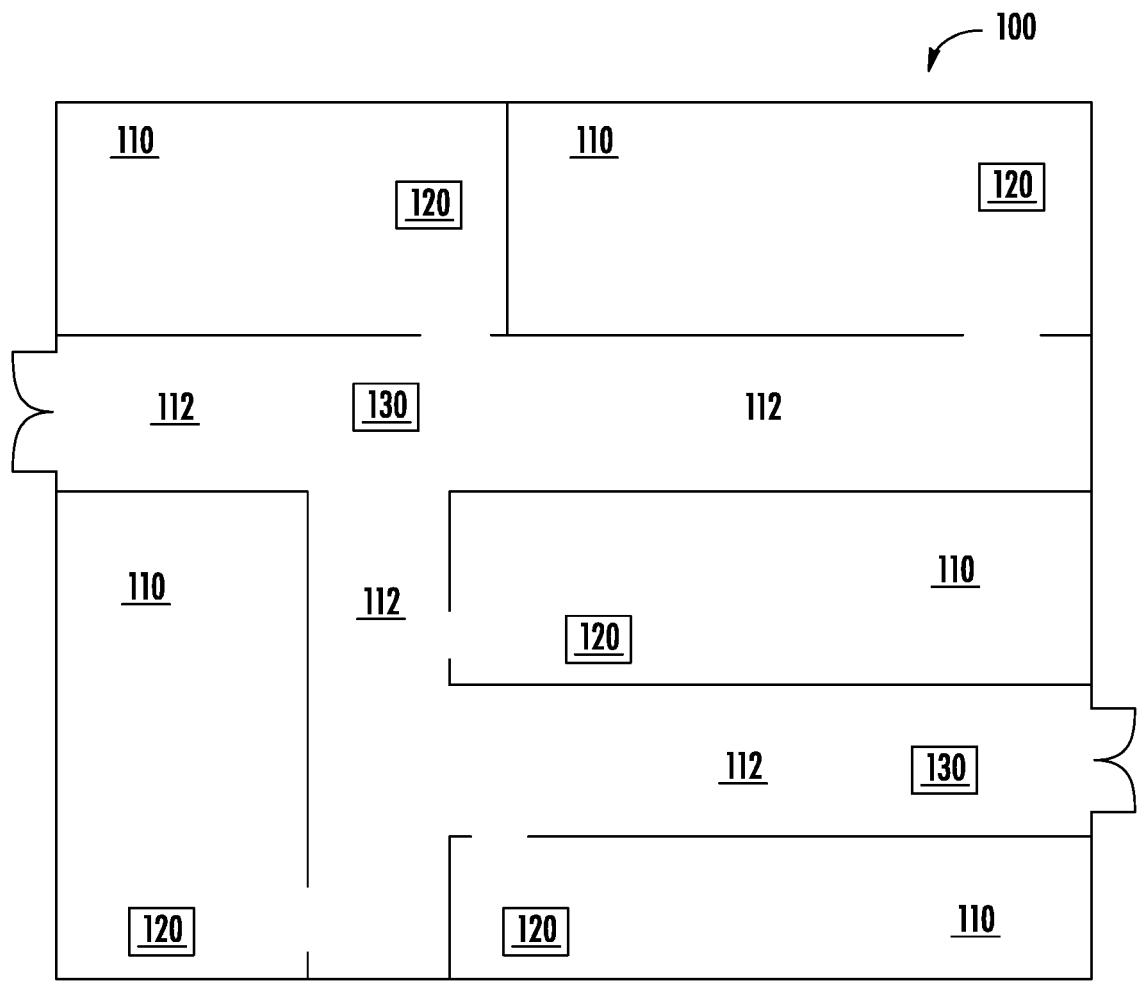
FIG. 1 depicts space having one or more connected devices according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to methods for determining a location of a person or object within a space. In some implementations, a method according to example aspects of the present disclosure can include obtaining, by one or more computing devices, data from one or more sensor devices associated with one or more connected devices located within the space. For example, the data obtained from the one or more sensor devices can be indicative of one or more audible sounds within the space. Alternatively or additionally, the data can be indicative of power consumption of a powered load that is selectively coupled to a power source via the one or more connected devices. As will be discussed below in more detail, the data obtained from the one or more sensory devices can be used to generate metadata indicative of presence of the person or object within the space.

In some implementations, the method can include inputting, by the one or more computing devices, the data obtained from the one or more sensory devices as an input to a classifier (e.g., machine-learned model). The classifier can be configured to detect presence of persons or objects within the space based, at least in part, on the data obtained from the one or more sensory devices.

As such, the method can further include obtaining, by the one or more computing devices, the metadata as an output of the classifier. The metadata can be indicative of a location of the person or object within the space and, in some implementations, can further include a timestamp to indicate when the person or object was detected within the space.

In some implementations, the method can include obtaining, by the one or more computing devices, data indicative of a user request to obtain a location of the person or object within the space. For example, the data indicative of the user request can be audio data indicative of one or more voice commands (e.g., "Where was Warren last seen?" or "Show me all videos of Warren") spoken by a user to request the location of the person or object within the space. It should be appreciated, however, that the user can provide data indicative of the user request via any suitable method. For instance, in some implementations, the data indicative of the user request can be obtained via user-interaction with an application (e.g., mobile app) executing on a mobile computing device (e.g., smartphone, tablet, etc.) associated with the user. As will be discussed below in more detail, the metadata can be used to determine a location of the person or object within the space.

The method can include determining, by the one or more computing devices, the location of the person or object within the space based, at least in part, on the metadata. For example, in some implementations the metadata can be associated with video data obtained from one or more image capture devices within the space. More specifically, the metadata can be associated with one or more frames of the video data having a timestamp that corresponds to the timestamp associated with the metadata. In this manner, the metadata can be associated with frames of the video data that depict the person or object within the space. As such, the method can, in some implementations, include determining the location of the person or object based on the one or more frames associated with the metadata.

In some implementations, the one or more computing devices can be configured to provide a notification indicative of the location of the person within the space. For instance, the notification can be an audible notification (e.g., "Warren was last seen in the board room at noon") provided via one or more output devices (e.g., speakers) of the one or more connected devices. Alternatively or additionally, the notification can be a visual notification. For instance, in some implementations, the visual notification can include displaying, by the one or more computing devices, one or more videos in which the person or object is depicted on one or more output devices. In some implementations, the one or more output devices (e.g., display screen) can be associated with the one or more connected devices. Alternatively or additionally, the notification can be provided to a mobile computing device (e.g., smartphone, tablet, etc.) associated with the user that requested the location of the person. For instance, the notification can be a visual notification (e.g., text message, e-mail). Alternatively or additionally, the notification can be an audible notification, such as an automated phone call.

The computing system according to example aspects the present disclosure can provide numerous technical benefits, particularly in the area of computing technology. For example, generating the metadata indicative of user presence can facilitate searching of information, which can preserve computing resources for more core functionality of a connected device, network, and/or associated systems. As another example, associating the metadata with one or more frames of video data reduces the amount of video data the one or more computing devices must search in order to determine the location of the person within the space. In this manner, an amount of time available to the one or more computing devices to perform critical processing functions can be increased.

Referring now to FIG. 1, an example space 100 is provided according to example embodiments of the present disclosure. As shown, the interior of space 100 is divided into a plurality of rooms 110 and hallways 112. Although the space 100 is depicted as having only one story, it should be understood that the present disclosure is not limited to single-story buildings. As shown, a plurality of connected devices 120 are disposed throughout the interior of the space 100. For instance, at least one of the plurality of connected devices 120 can be located in each of the plurality of rooms 110. Alternatively or additionally, one or more of the plurality of connected devices 120 can be located within the hallways 112 of the space 100.

In some implementations, one or more image capture devices 130 can be located throughout the interior of the space. As shown, the one or more image capture devices 130 can be standalone devices that are separate from the plurality of connected devices 120. In alternative implementations, however, the one or more image capture devices 130 can be a part of (e.g., integral) with one or more of the plurality of connected devices 120.

As shown, the one or more image capture devices 130 can be located within the hallways 112 of the space 100. It should be appreciated, however, that the one or more image capture devices 130 can be located at any suitable location within the interior of the space 100. For instance, in some implementations, an image capture device 130 can be located in each of the plurality of rooms 110. In this manner, the image capture device 130 can obtain video data indicative of events occurring within the corresponding room of the plurality of rooms 110.

Figure 2:
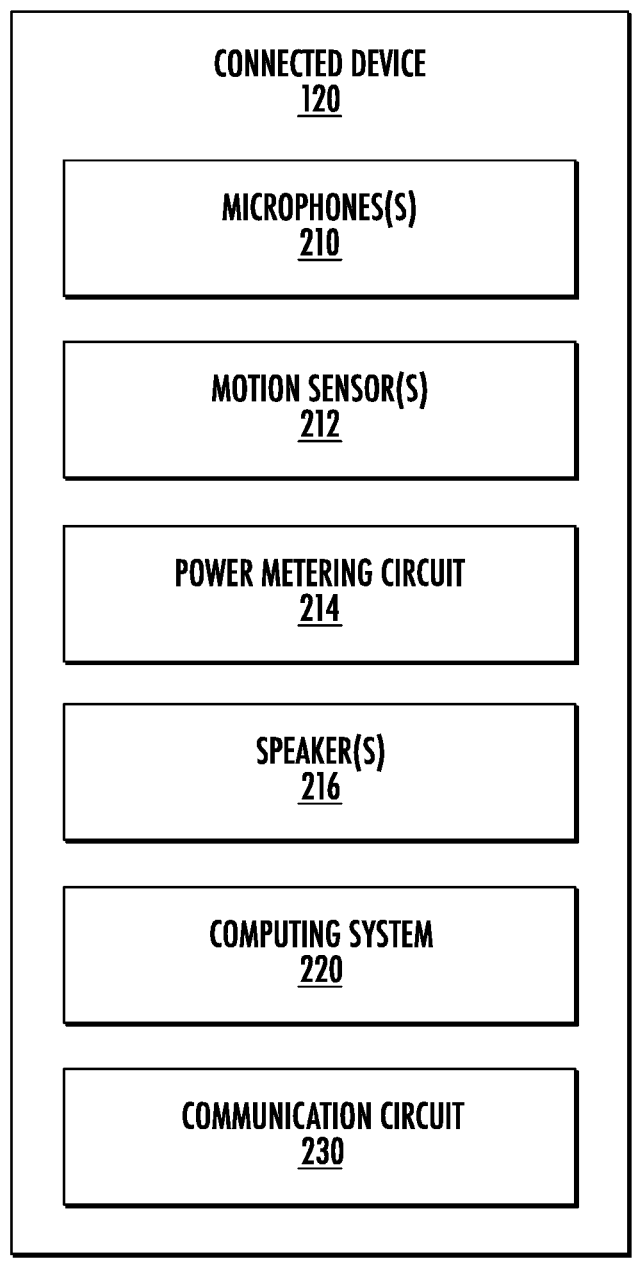
FIG. 2 depicts a block diagram of components of a connected device according to example embodiments of the present disclosure.

Referring now to FIG. 2, suitable components of the connected device 120 are provided according to example embodiments of the present disclosure. As shown, the connected device 120 can include one or more sensor devices. For instance, in some implementations the one or more sensor devices can include one or more microphones 210. The one or more microphones 210 can be configured to obtain audio data indicative of one or more audible sounds occurring within the space 100 (FIG. 1). For example, the one or more microphones 210 can obtain audio data indicative of a person talking within the space 100. As another example, the one or more microphones 210 can obtain audio data indicative of the person moving around within the space 100.

In some implementations, the one or more sensor devices of the connected device 120 can include one or more motion sensors 212. The one or more motion sensors 212 can be configured to obtain data indicative of motion occurring within the space 100 (FIG. 1). For instance, in some implementations the one or more motion sensors 212 can detect a person entering or exiting the space 100, or a particular area of the space 100. It should be understood, however, that any suitable type of motion sensor can be used to obtain data indicative of motion occurring within the space 100. For instance, in some implementations the one or more motion sensors can include a passive infrared (PIR) sensor.

In some implementations, the connected device 120 can be configured to selectively couple one or more powered loads (not shown) to a power source (e.g., AC mains). In such implementations, the one or more sensory devices of the connected device 120 can include a power metering circuit 214. The power metering circuit 214 can include at least one of a current sensor and a voltage sensor. In this manner, the power metering circuit 214 can obtain data indicative of power consumption of the one or more powered loads when coupled to the power source via the connected device 120.

In some implementations, the connected device 120 can include one or more output devices. For example, the one or more output devices can include one or more speakers 216. In this manner, audible notifications can be provided to one or more persons within the space 100 (FIG. 1) via the one or more speakers 216.

In some implementations, the connected device 120 can include a computing system 220. The computing system 220 can be communicatively coupled to the one or more sensor devices (e.g., microphones(s) 210, motion sensor(s) 212, power metering circuit 214). In this manner, the computing system 200 can obtain data from the one or more sensor devices. In addition, the computing system 220 can be operatively coupled to the one or more output devices (e.g., speaker(s) 216). In this manner, the computing system 220 can provide notifications via the one or more output devices of the connected device 120.

In some implementations, the connected device 120 can include a communication circuit 230. The communication circuit 230 can include associated electronic circuitry that can be used to communicatively couple the computing system 220 with other devices, such as the computing device(s) 240 associated with other connected devices 120 within the space 100 (FIG. 1). In some implementations, the communication circuit 230 can allow the computing system 220 to communicate directly with the other connected devices. In alternative implementations, the communication circuit 230 can provide for communication with the other connected devices over a network.

The network can be any suitable type of network, such as a Power-Over-Ethernet (POE) network, a local area network (e.g., intranet), a wide area network (e.g., internet), a low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), Power over Ethernet, etc. Other suitable wired and/or wireless communication technologies can be used without deviating from the scope of the present disclosure.

Figure 3:
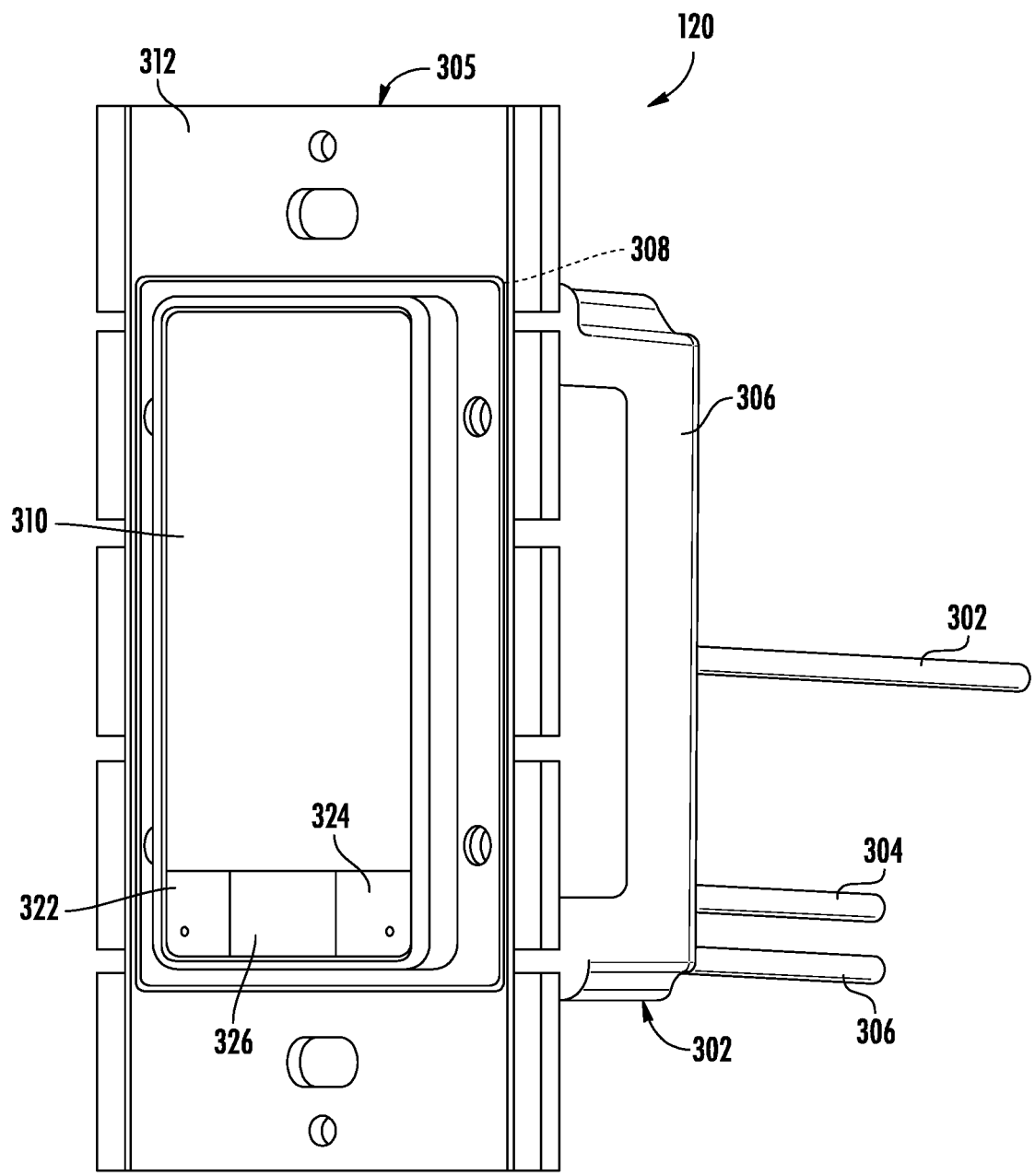
FIG. 3 depicts a perspective view of a connected device according to example embodiments of the present disclosure.

Referring now to FIG. 3, an example connected device 120 is provided according to example embodiments of the present disclosure. As shown, in some implementations the connected device 120 can be a power switch configured to receive conductors 302, 304, and 306 for delivery of power to one or more powered loads. For instance, power can be delivered from a power source (e.g., breaker, panel, etc.) to the connected device 120 via conductors 304 and 306. In some implementations, conductor 304 can be a hot conductor and conductor 306 can be a neutral conductor. Furthermore, conductor 302 can be a load conductor (e.g., load wire) used to deliver power to one or more powered loads (e.g., lighting fixtures, electronic devices, powered outlets, appliances, machinery, etc.).

In some implementations, the connected device 120 can be configured to control delivery of power to one or more powered loads via conductor 302 via a power interrupter. The power interrupter can control whether power is delivered via conductor 302. In some implementations, the power interrupter can be a thyristor 355 (e.g., a TRIAC). When the thyristor 355 is in a first state, power is conducted to the one or more powered loads via conductor 302. When the thyristor 355 is in a second state, power is not conducted to the one or more powered loads via conductor 302.

Aspects of the present disclosure are discussed with reference to a thyristor power interrupter for purposes of illustration and discussion. Other suitable devices and/or components can be used to control power delivery via conductor 302 without deviating from the scope of the present disclosure, such as power semiconductors, relays, contactors, mechanical switches, etc.

In some implementations, the state of the thyristor 355 can be controlled based on various inputs. For instance, the state of the thyristor 355 can be controlled based on a user input received at an interface element, such as a rocker button 310 or switch of the connected device 120. The state of the thyristor 355 can also be controlled based on signals received from other devices (e.g., user devices such as a smartphone, tablet, wearable device, laptop, display with one or more processors) received over a communication link.

In some implementations, a front panel 305 of the connected device 120 can include the rocker button 310, a paddle housing 308, and a heat sink 312. The rocker button 310 can be received into the paddle housing 308. The rocker button 310 can be rotatable about an axis passing through the center of the rocker button 310 so that the rocker button 310 can be rotated in a first direction when the user presses a top portion of the rocker button 310 and can be rotated in a second direction that is different than the first direction when the user presses a bottom portion of the rocker button 310.

When a user presses the rocker button 310 to rotate the rocker button 310 in a first direction, the thyristor 355 can be controlled to be in a first state to allow the delivery of power via conductor 302 to one or more powered loads. When a user presses the rocker button 310 to rotate the rocker button 310 in a second direction, the thyristor 355 can be controlled to be in a second state to stop the delivery of power via conductor 302 to one or more powered loads.

In some implementations, the front panel 305 of the connected device 120 can include a first button 322 and a second button 324. As shown, a Fresnel lens 326 can, in some implementations, be disposed between the first button 322 and the second button 324. A user can interact with the first button 322 and the second button 324 to control various operations of the connected device 120.

In some implementations, the first button 322 can be a pairing button. More particularly, a user can interact with the first button 322 (e.g., depress and/or pull out the first button 322) to initiate a pairing sequence with another device, such as a powered load, another power switch, or a user device. A pairing sequence can be used to enable communication between the connected device 120 and another device. For instance, the pairing sequence can be used to allow for communication between the connected device 120 and another device using a direct peer to peer communication protocol. Any of a number of suitable interactions (e.g., sequence of user interactions) via the first button can be used to initiate a pairing sequence without deviating from the scope of the present disclosure.

In some implementations, the second button 324 can be an air gap switch. User interaction with the air gap switch can be used to remove power from the connected device 120 and/or the one or more powered loads. In some implementations, the user can interact with the second button 324 by pulling the second button 324 away from the front panel 305. The second button 324 can be associated with a long plunger arm such that when the second button 324 is pulled away from the front panel 105, power to the connected device 120 and one or more connected loads is removed. In some implementations, the user can interact with the second button 324 by pushing the second button 324 towards the front panel 305. For example, the user can push the second button 324 towards the front panel 305 to perform one or more functions. As an example, the one or more functions can include activating a digital voice assistant service (e.g., Alexa, Siri, Google, etc.).

Figure 4:
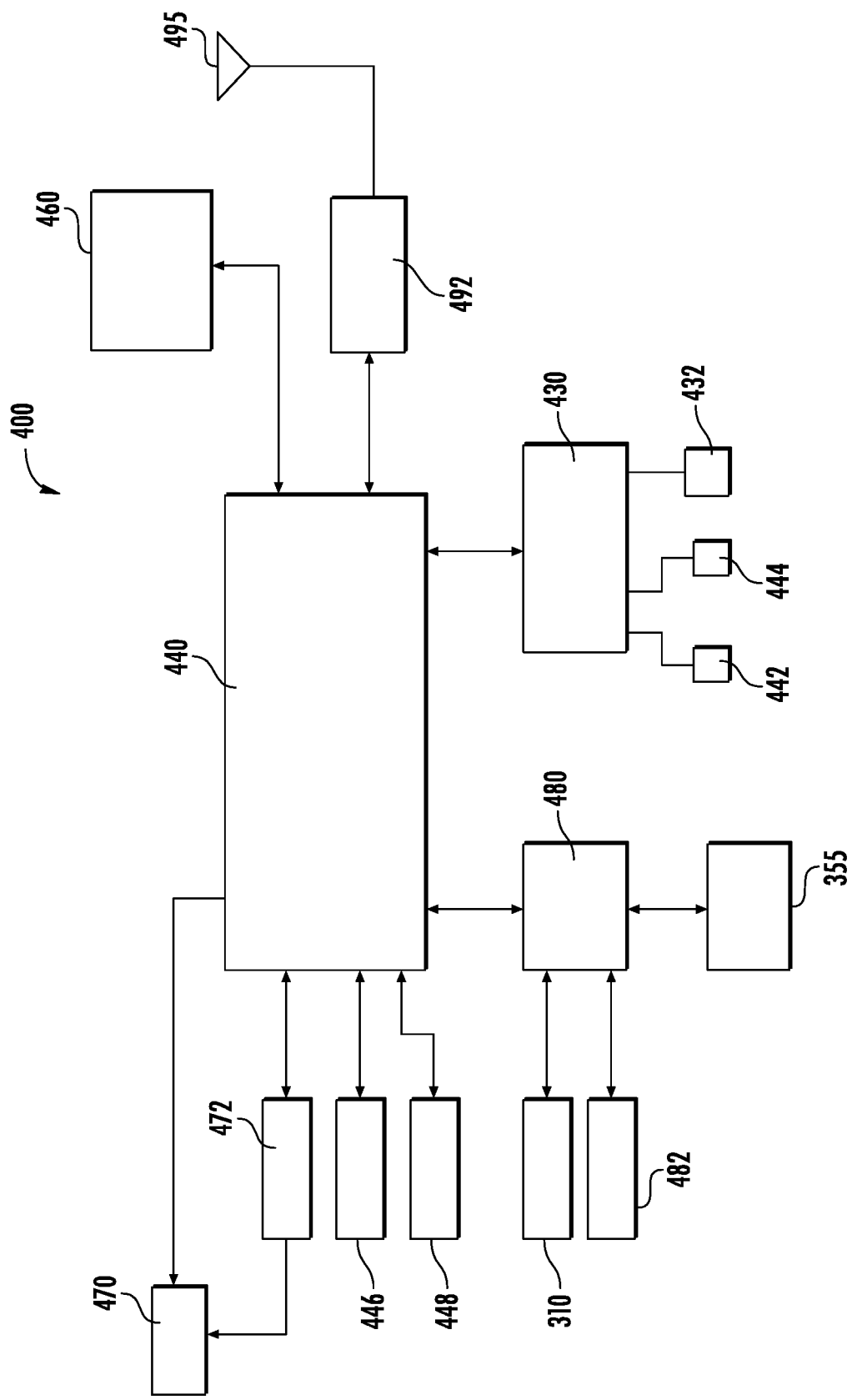
FIG. 4 depicts another block diagram of components of the connected device of FIG. 3 according to example embodiments of the present disclosure.

Referring now to FIG. 4, a block diagram of an example control system 400 of the connected device 120 is provided according to example embodiments of the present disclosure. The control system 400 can includes one or more processors 440 and one or more memory devices 460. For instance, the one or more processors 440 can include dual (e.g., two) processors. Alternatively, the one or more processors 440 can include quad (e.g., four) processors.

The one or more processors 440 can be any suitable processing device, such as microprocessors, integrated circuits (e.g., application specific integrated circuits), field programmable gate arrays, etc. that perform operations to control components (e.g., any of the components described herein). The one or memory devices 460 can be any suitable media for storing computer-readable instructions and data. For instance, the one or more memory devices 460 can include random access memory such as dynamic random access memory (DRAM), static memory (SRAM) or other volatile memory. In addition, and/or in the alternative, the one or more memory devices can include non-volatile memory, such as ROM, PROM, EEPROM, flash memory, optical storage, magnetic storage, etc.

The one or more memory devices 460 can store computer-readable instructions that, when executed by the one or more processors 440, cause the one or more processors 440 to perform operations, such as any of the operations described herein. The instructions can be software written in any suitable programming language or can be implemented in hardware.

The one or more memory devices 460 can also store data that can be obtained, received, accessed, written, manipulated, created, and/or stored. As an example, the one or more memory devices 460 can store data associated with one or more classifier models (e.g., machine learned classifier models) that can be used to classify data obtained from one or more sensor devices (e.g., microphones, power metering circuit, motion sensors) of the connected device 120. More specifically, the one or more classifier models can classify the data as being indicative of presence of a person or object within the space or not being indicative of presence of a person or object within the space. Storing the classifier model(s) locally in the one or more memory devices 460 can allow for local processing of data obtained from the one or more sensor devices of the connected device 120.

Referring still to FIG. 4, the one or more processors 440 can be in communication with and/or can be configured to control operation of audio circuitry 430. The audio circuitry 430 can be configured to receive and process audio data received from, for instance, a first microphone 442 of the connected device 120 and a second microphone 444 of the connected device 120. The audio circuitry 430 can also provide audio output for a speaker 432 of the connected device 120. In some implementations, the audio circuitry 430 can include one or more of a digital signal processor (DSP), codec, amplifier, etc. For instance, the audio circuitry 430 can be a low power smart Codec with dual core audio DSP. In some embodiments, the audio circuitry 430 can include a CS47L24 Smart Codec with Dual Core DSP manufactured by Cirrus Logic.

In some implementations, the one or more processors 440 can be in communication with and/or can be configured to control operation of a microcontroller 480. The microcontroller 480 can be configured to control the thyristor 355 and/or provide signals to the one or more processors 440 for control of components based on inputs received via interface elements of the connected device 120, such as the rocker button 310, the first button 322, the second button 324, or other interface elements. The microcontroller 480 can also receive signals from one or more motion sensors 482 of the connected device 120. In some implementations, the one or more motion sensors 482 can include a PIR sensor. It should be appreciated, however, that the connected device 120 can include any suitable type of motion sensor. In some implementations, the one or more classifier models stored on the one or more memory devices 460 of the connected device can be configured to classify data obtained from the one or more motion sensors 482 as being indicative of presence of a person or object within the space or not being indicative of presence of a person or object within the space.

In some implementations, the one or more processors 440 can be in communication with an ambient light sensor 446. Signals from the ambient light sensor 446 can be used, for instance, by the processor(s) 440 to implement control actions (e.g., control of power delivery to one or more powered loads) based on the ambient lighting in a space. In some implementations, the ambient light sensor 446 can be a LTR-329ALS-01 digital light sensor manufactured by Mouser Electronics The one or more processors 440 can be in communication with and/or can be configured to control operation of a power metering circuit 448. The power metering circuit 448 can be configured measure voltage and/or current flowing through a load wire passing through the connected device 120. Current can be measured, for instance, using a sense resistor. Voltage can be measured using, for instance, a voltage divider. Power flowing through the load wire can be computed (e.g., using one or more processors 440 located on the connected device 120 and/or remote from the connected device 120) based on the measured current and voltage. In some implementations, the power metering circuit 448 can be a STPM32 metering circuitry manufactured by STMicroelectronics.

In some implementations, data obtained from the power metering circuit 448 of the connected device 120 can be provided as an input to the one or more classifier models stored on the one or more memory devices 460 of the connected device 120. The one or more classifier models can process the data and generate metadata based, at least in part, on the data obtained from the power metering circuit 448. The metadata can indicate a person or object is present in the space. In some implementations, the metadata can include a timestamp indicative of when presence of the person or object within the space was detected.

The one or more processors 440 can be in communication with an LED driver circuit 470 and a LED board 472 to control operation of an indicator for the connected device 120. The LED driver circuit 470 can provide power to the LED board 472 for driving the plurality of LEDs. The one or more processors 440 can control emission of light from one or more LEDs on the LED board 472 to provide various indicators (e.g., light ring, night light, etc.). In some implementations, the LED driver circuit 470 can be a IS31FL3235 LED driver manufactured by Integrated Silicon Solution, Inc.

The one or more processors 440 can be in communication with a communication interface 492. The communication interface 492 can allow for the communication of data via, for instance, one or more wireless links using the antenna 495. The communication interface 492 can include any circuits, components, software, etc. for communicating over various communication links (e.g., networks). In some implementations, the communication interface 492 can include for example, one or more of a communications controller, receiver, transceiver, transmitter, port, conductors, software, and/or hardware for communicating data. In some implementations, the communication interface 492 can include a SX-SDPAC module manufactured by Silex Technology.

Example communication technologies and/or protocols can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, ZigBee, HaLow, cellular communication, LTE, low-power wide area networking, VSAT, Ethernet, MoCA (Multimedia over Coax Alliance), PLC (Power-line communication), DLT (digital line transmission), etc. Other suitable communication technologies and/or protocols can be used without deviating from the scope of the present disclosure.

Figure 5:
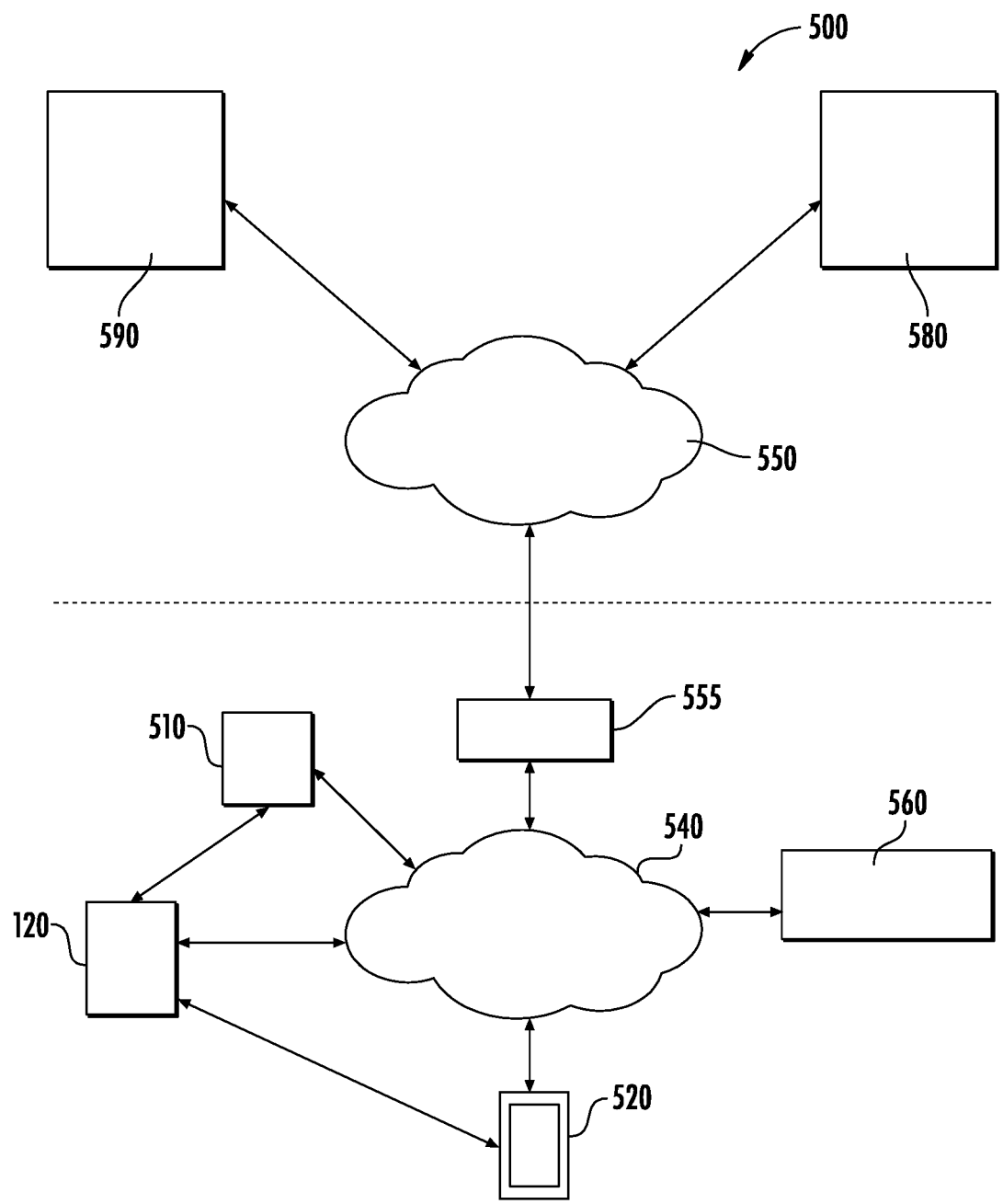
FIG. 5 depicts a system for determining location of a person within a space according to example embodiments of the present disclosure.

Referring now to FIG. 5, a system 500 for determining a location of a person within a space is provided according to example embodiments of the present disclosure. As shown, the system 500 can include the plurality of connected devices 120 (only one shown). The plurality of connected devices 120 can be located throughout a space, such as the space 100 discussed above with reference to FIG. 1. The connected devices 120 can be in communication with various devices. For instance, in some implementations, one of the connected devices 120 can be a power switch in communication with a powered load 510. The powered load 510 can be any device powered by the power switch, such as one or more lighting fixtures or other light sources, appliances, electronics, consumer devices, ceiling fans, machinery, systems, or any other suitable type of powered load. Alternatively or additionally, the connected devices 120 can be in communication with user devices 520, 560. For instance, user devices 520, 560 can include one or more smartphones, laptops, desktops, tablets, wearable devices, media devices, displays with one or more processors, or other suitable devices.

In some implementations, one or more of the connected devices 120 can be in communication with the powered load 510, for instance, via a direct communication link (e.g., direct wired or wireless communication link) or via a network, such as a local area network 540. The direct communication link can be implemented, for instance, using Bluetooth low energy or other suitable communication protocol. The one or more connected devices 120 can control delivery of power to the powered load 510 via a load conductor. In some implementations, the one or more connected devices 120 can provide control signals to control operation (e.g., fan speed, dimming level, etc.) of the powered load 510 via the direct communication link.

In some implementations, one or more of the connected devices 120 can be in communication with the user devices 520, 560 for instance, via a direct communication link (e.g., direct wired or wireless communication link) or via a network, such as local area network 540. The direct communication link can be implemented, for instance, using Bluetooth low energy or other suitable communication protocol. In some embodiments, a user can control, view information, and/or specify one or more settings associated with the one or more connected devices 120 via a graphical user interface implemented on a display of the user device 520, 560. For instance, a user can access an application implemented on the user device 520. The application can present a graphical user interface on a display of the user device 520. A user can interact with the graphical user interface to control operation of the one or more connected devices 120 and/or the powered load 510.

The local area network 540 can be any suitable type of network or combination of networks that allows for communication between devices. In some embodiments, the network(s) can include one or more of a secure network, Wi-Fi network, IoT network, mesh network, one or more peer-to-peer communication links, and/or some combination thereof, and can include any number of wired or wireless links. Communication over the local network 340 can be accomplished, for instance, via a communication interface using any type of protocol, protection scheme, encoding, format, packaging, etc.

As shown, the system 500 can include a gateway 555 that can allow access to a wide area network 550. The wide area network 550 can be, for instance, the Internet, cellular network, or other network, and can include any number of wired or wireless links. Communication over the wide area network 550 can be accomplished, for instance, via a communication interface using any type of protocol, protection scheme, encoding, format, packaging, etc. As shown, the connected devices 120 can communicate information over the wide area network 550 to remote computing system 580 and 590 and other remote computing devices via the gateway 555.

In some implementations, the remote computing system 580 can be associated with a cloud computing platform for implementation of one or more services for the connected devices 120. Data collected by the cloud computing platform can be processed and stored and provided, for instance, to the user device 520 (e.g., for presentation in a graphical user interface).

In some implementations, remote computing system 590 can be associated with a service accessed by the connected devices 120, such as a digital audio assistant service. In some implementations, audio data collected via the one or more sensor devices can be communicated to the remote computing system 590 for processing of voice commands. Data responsive to the voice commands can be communicated to the connected devices 120 for output (e.g., by output devices) and/or to the user device 520 (e.g., for display in a graphical user interface). In this way, the connected devices 120 can act as a source for voice commands for digital voice assistant services.

The remote computing system 580 and 590 can include one or more computing devices. The one or more computing devices can include one or more processors and one or more memory devices. The remote computing systems 580 and 590 can be distributed such that its components are located in different geographic areas. The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 6:
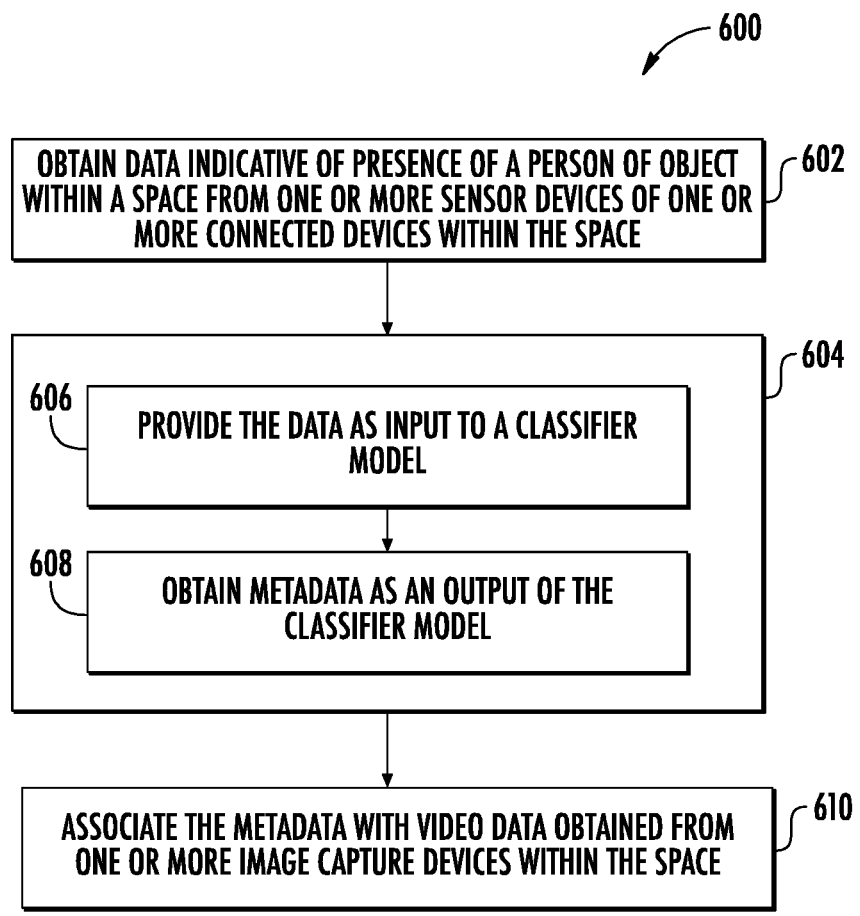
FIG. 6 depicts a flow diagram of a method for generating metadata based on data obtained from one or more connected devices within a space according to example embodiments of the present disclosure.

Referring now to FIG. 6, a flow diagram of a method 600 for generating metadata based on data obtained from one or more connected devices within a space is provided according to example embodiments of the present disclosure. It should be appreciated that the method 600 can be implemented using the system 500 discussed above with reference to FIG. 5. FIG. 6 depicts steps performed in a particular order for purposes of illustration and discussion. Those of ordinary skill in the art, using the disclosures provided herein, will understand that various steps of the method 600 can be adapted, modified, rearranged, performed simultaneously or modified in various ways without deviating from the scope of the present disclosure.

At (602), the method 600 can include obtaining, by one or more computing devices of a computing system, from one or more sensor devices associated with one or more connected devices located within the space. For instance, in some implementations, the data can be audio data indicative of one or more audible sounds obtained by one or more microphones of the one or more connected devices. Alternatively or additionally, the data can be indicative of one or more powered loads consuming power provided from a power source (e.g., AC mains) via one of the connected devices within the space.

At (604), the method 600 includes generating, by the one or more computing devices, metadata indicative of the location of the person or object within the space based, at least in part, on the data obtained at (602). In some implementations, generating metadata indicative of the location of the person or object can include, at (606), inputting, by the one or more computing devices, the data obtained at (602) as an input to a classifier model (e.g., machine-learned model) configured to classify the data as being indicative of presence of the person or object within the space. The classifier model can be implemented using a machine learned model. For instance, the machine-learned model can include, without limitation, a convolutional neural network, a decision tree, a Bayesian network, a support vector machine, a K-means cluster, etc. If the classifier model determines the data obtained from the one or more sensor devices indicates presence of the person or object within the space, generating metadata can include, at (608), outputting, by the one or more computing devices, metadata indicative of presence of the person or object as an output of the classifier model. Furthermore, in some implementations, the metadata can include a timestamp indicative of when presence of the person or object was detected.

In some implementations, the method 600 can further include associating, by the one or more computing devices, the metadata with video data obtained from one or more image capture devices within the space. For instance, the metadata can be associated with one or more frames of the video data having a timestamp that corresponds to the timestamp associated with the metadata. In this manner, the one or more computing devices can be configured to search only the one or more frames of video data associated with the metadata to determine a location of the person or object.

Figure 7:
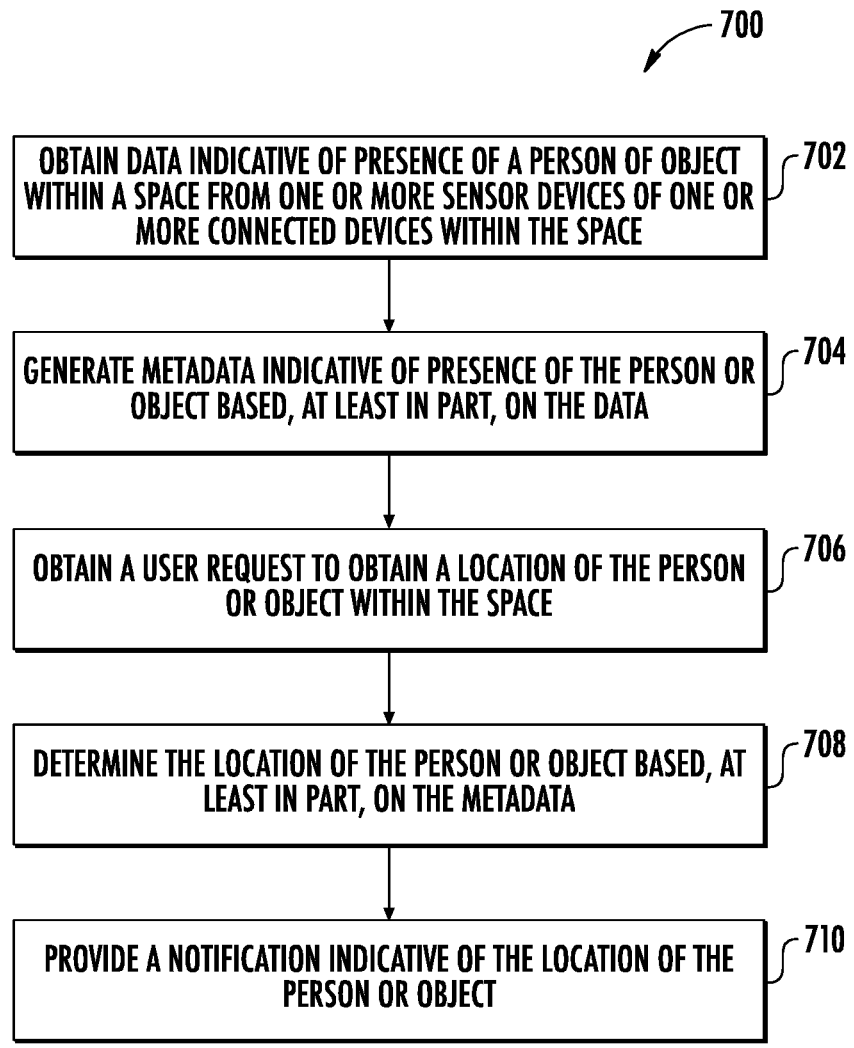
FIG. 7 depicts a flow diagram of a method for determining a location of a person or object within a space is provided according to example embodiments of the present disclosure.

Referring now to FIG. 7, a flow diagram of a method 700 for determining a location of a person or object within a space is provided according to example embodiments of the present disclosure. It should be appreciated that the method 700 can be implemented using the system 500 discussed above with reference to FIG. 5. It should be appreciated that, in some implementations, one or more steps of the method 700 can be performed locally by the computing system of the one or more connected device. Alternatively, in some implementations, one or more steps of the method 700 can be performed by the remote computing systems discussed above with reference to FIG. 5. Furthermore, although FIG. 7 depicts steps performed in a particular order for purposes of illustration and discussion, those of ordinary skill in the art, using the disclosures provided herein, will understand that various steps of the method 700 can be adapted, modified, rearranged, performed simultaneously or modified in various ways without deviating from the scope of the present disclosure.

At (702), the method 700 can include obtaining, by one or more computing devices of a computing system, from one or more sensor devices associated with one or more connected devices located within the space. For instance, in some implementations, the data can be audio data indicative of one or more audible sounds obtained by one or more microphones of the one or more connected devices. Alternatively or additionally, the data can be indicative of one or more powered loads consuming power provided from a power source (e.g., AC mains) via one of the connected devices within the space.

At (704), the method 700 includes generating, by the one or more computing devices, metadata indicative of the location of the person or object within the space based, at least in part, on the data obtained at (702). In some implementations, generating metadata indicative of the location of the person or object can include inputting, by the one or more computing devices, the data obtained at (702) as an input to a classifier model (e.g., machine-learned model) configured to classify the data as being indicative of presence of the person or object within the space. The classifier model can be implemented using a machine learned model. For instance, the machine-learned model can include, without limitation, a convolutional neural network, a decision tree, a Bayesian network, a support vector machine, a K-means cluster, etc. If the classifier model determines the data obtained from the one or more sensor devices indicates presence of the person or object within the space, generating metadata can obtaining, by the one or more computing devices, metadata indicative of presence of the person or object as an output of the classifier model. Furthermore, in some implementations, the metadata can include a timestamp indicative of when presence of the person or object was detected.

At (706), the method 700 can include obtaining, by one or more computing devices of a computing system, data indicative of a user request to obtain the location of the person or object within the space. For instance, the data indicative of the user request can include audio data obtained via the one or more sensor devices (e.g., microphones) of one or more of the connected devices.

At (708), the method 600 can include determining, by the one or more computing devices, the location of the person or object within the space based, at least in part, on metadata generated based on data obtained from one or more sensor devices of one or more connected devices within the space. In some implementations, the metadata obtained at (604) an be associated with one or more frames of video data obtained from one or more image capture devices within the space. For instance, the metadata can be associated with one or more frames of the video data having a timestamp that corresponds to a timestamp associated with the metadata and indicative of when presence of the person or object was detected. In this manner, an amount of time required to determine the location of the person or object within the space can be reduced, because the one or more computing devices only search the one or frames of video data that are associated with the metadata generated at (704).

In some implementations, the one or more computing devices can be configured to implement one or more facial recognition techniques on the one or more frames of video data to determine whether the person or object depicted in the one or more frames of video data corresponds to the person or object associated with the user request obtained at (706). In some implementations, the one or more computing devices can generate metadata while implementing the one or more facial recognition techniques on the one or more frames. For instance, in some implementations the metadata generated while implementing the one or more facial recognition techniques can be indicative of a location of the person or object within the space. In some implementations, the metadata generated at (704) can be combined with the metadata generated while implementing one or more facial recognition techniques on the one or more frames to determine a location of the person or object within the space. In this manner, data obtained in multiple domains (e.g., audio, video, etc.) can be used to determine the location of the person or object within the space.

At (710), the method 700 can include providing, by the one or more computing device a notification indicative of the location of the person within the space. For instance, the notification can be an audible notification provided via one or more output devices (e.g., speakers) of one or more of the connected devices. Alternatively or additionally, the notification can be provided to the user device (e.g., smartphone, tablet, etc.) associated with the user that requested the location of the person. For instance, the notification can be a visual notification (e.g., text message, e-mail). Alternatively or additionally, the notification can be an audible notification, such as an automated phone call.

In some implementations, the method 700 can further include determining, by the one or more computing devices, one or more patterns indicative of movement of the person or object based, at least in part, on the data obtained at (702) and the metadata generated at (704). In this manner, the one or more computing devices can learn habits of the person or object that can be used in determining the location of the person or object. For instance, the one or more computing devices can determine the person or object is located with a room or area of the space on a particular day and/or time. In this manner, the one or more patterns determined by the one or computing devices can, in some implementations, be relied upon to determine the location of the person or object.

Figure 8:
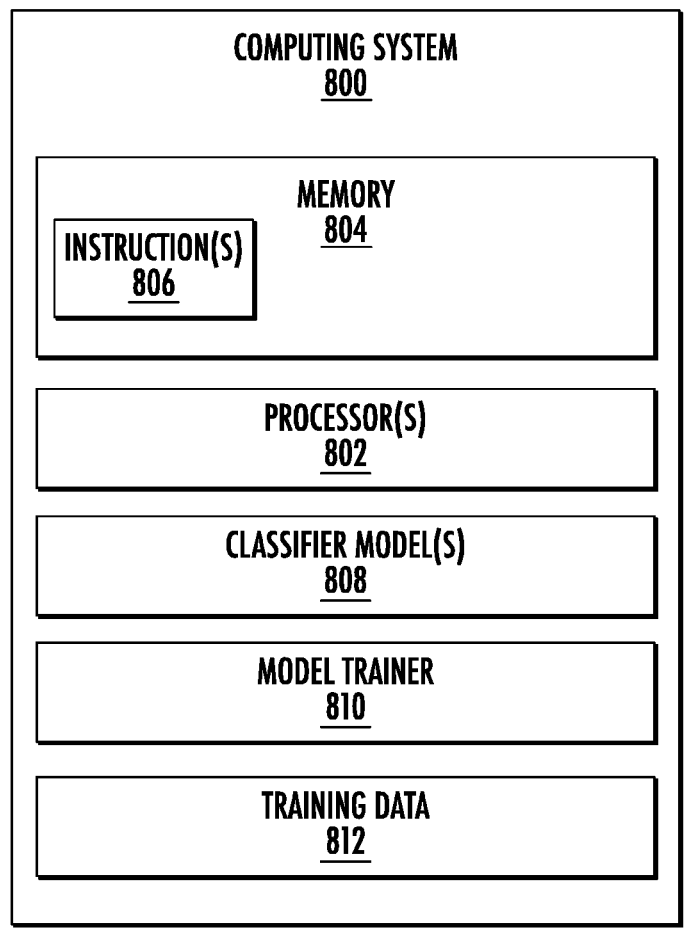
FIG. 8 depicts a block diagram of components of a computing system according to example embodiments of the present disclosure.

FIG. 8 illustrates suitable components of a computing system 800 according to example embodiments of the present disclosure. It should be understood that at least one of computing systems 220, 580, 590 discussed above with reference to FIGS. 2 and 5 can be configured as the computing system 800 of FIG. 8. As shown, the computing system 800 can include one or more processors 802 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the computing system 800 can include a memory device 804. Examples of the memory device 804 can include computer-readable media including, but not limited to, non-transitory computer-readable media, such as RAM, ROM, hard drives, flash drives, or other suitable memory devices. The memory device 804 can store information accessible by the processor(s) 802, including computer-readable instructions 806 that can be executed by the processor(s) 802. The computer-readable instructions 806 can be any set of instructions that, when executed by the processor(s) 802, cause the processor(s) 802 to perform operations, such as the methods discussed above with reference to FIGS. 6 and 7. The computer-readable instructions 806 can be software written in any suitable programming language or can be implemented in hardware. In some implementations, the computer-readable instructions 806 can be executed by the processor(s) 802 to perform operations, such as generating metadata based, at least in part, on data obtained from one or more sensory devices of one or more of the plurality of connected located within the space.

In some implementations, the computing system 800 can include one or more classifier models 808. For example, the one or more classifier models 808 can include various machine-learned models, such as a random forest classifier; a logistic regression classifier; a support vector machine; one or more decision trees; a neural network; and or other types of machine-learned models, including both linear models and non-linear models. Example neural networks can include feed-forward neural networks, recurrent neural networks (e.g., long short-term memory recurrent neural networks), or other forms of neural networks.

In some implementations, the computing system 800 can train the one or more classifier models 808 through use of a model trainer 810. The model trainer 810 can train the one or more classifier models 808 using one or more training or learning algorithms. One example training technique is backwards propagation of errors ("backpropagation"). For example, backpropagation can include Levenberg-Marquardt backpropagation. In some implementations, the model trainer 810 can perform supervised training techniques using a set of labeled training data. In other implementations, the model trainer 810 can perform unsupervised training techniques using a set of unlabeled training data. The model trainer 810 can perform a number of generalization techniques to improve the generalization capability of the models being trained. Generalization techniques include weight decays, dropouts, or other techniques.

In particular, the model trainer 810 can train the one or more classifier models 808 based on a set of training data 812. The training data 812 can includes a number of training examples. Each training example can include example features that are labelled as being indicative of whether or not the person or object is present within the space. The features can, in some implementations, include raw data from the one or more sensor devices of the one or more connected devices within the space.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A method for determining a location of a person or object within a space, the method comprising:
    obtaining, by one or more computing devices, data from one or more sensor devices associated with one or more connected devices located within the space, wherein the data includes power data indicative of power consumption of a powered load selectively coupled to a power source via the one or more connected devices;
    generating, by the one or more computing devices, metadata indicative of presence of the person or object within the space based, at least in part, on the data;
    obtaining, by the one or more computing devices, data indicative of a user request associated with obtaining a location of the person or object within the space;
    determining, by, the one or more computing devices, the location of the person or object based, at least in part, on the metadata; and
    providing, by the one or more computing devices, a notification indicative of the location of the person or object.

2. The method of claim 1, wherein generating metadata indicative of presence of the person or object within the space comprises:
    inputting, by the one or more computing devices, the data obtained from the one or more sensor devices as an input to a machine-learned model; and
    obtaining, by the one or more computing devices, the metadata as an output of the machine-learned model.

3. The method of claim 1, wherein the metadata includes a timestamp indicative of when presence of the person or object within the space was detected.

4. The method of claim 1, further comprising:
    associating, by the one or more computing devices, the metadata with one or more frames of video data obtained from one or more image capture devices located within the space.

5. The method of claim 1, wherein determining the location of the person or object comprises:
    determining, by the one or more computing devices, the location of the person or object based, at least in part, on the one or more frames of the video data.

6. The method of claim 1, wherein the one or more sensor devices includes a power metering circuit providing the power data.

7. The method of claim 1, further comprising:
    determining, by the one or more computing devices, one or more patterns indicative of movement of the person or object within the space based, at least in part, on the metadata.

8. The method of claim 7, wherein determining one or more patterns associated with movement of the person or object within the space comprises:
    inputting, by the one or more computing devices, the metadata as an input to a machine-learned model; and
    obtaining, by the one or more computing devices, data indicative of the one or more patterns as an output of the machine-learned model.

9. A system for determining a location of a person within a space, the system comprising:
    one or more connected devices located within the space, the one or more connected devices comprising one or more sensor devices; and
    one or more computing devices configured to:
        obtain data from the one or more sensor devices, wherein the data includes power data indicative of power consumption of a powered load selectively coupled to a power source via the one or more connected devices;
        generate metadata indicative of presence of the person or object within the space based, at least in part, on the data;
        obtain data indicative of a user request associated with obtaining a location of the person or object within the space;
        determine the location of the person or object based, at least in part, on the metadata; and
        provide a notification indicative of the location of the person or object.

10. The system of claim 9, wherein the one or more connected devices comprise a power switch configured to selectively couple a powered load to a power source.

11. The system of claim 9, wherein the one or more sensor devices comprise a power metering circuit configured to measure power consumption of the powered load.

12. The system of claim 9, wherein the one or more sensor devices comprise one or more selected from a group comprising:
    microphones and,
    motion sensors.

13. The system of claim 9, wherein the one or more connected devices further comprise one or more output devices, and wherein the one or more computing devices are configured to provide the notification via the one or more output devices.

14. The system of claim 9, wherein the one or more output devices comprise one or more speakers.

15. A connected device comprising:
    one or more sensing devices configured to sense the presence of a person or object in a space in which the connected device is positioned; and,
    one or more computing devices configured to:
        obtain data from the one or more sensor devices, wherein the data includes power data indicative of power consumption of a powered load selectively coupled to a power source via the one or more connected devices;
        generate metadata indicative of presence of the person or object within the space based, at least in part, on the data;
        obtain data indicative of a user request associated with obtaining a location of the person or object within the space;
        determine the location of the person or object based, at least in part, on the metadata; and
        provide a notification indicative of the location of the person or object.

16. The connected device of claim 15, wherein the one or more connected devices comprise a power switch configured to selectively couple a powered load to a power source.

17. The connected device of claim 15, wherein the one or more sensor devices comprise a power metering circuit configured to measure power consumption of the powered load.

18. The connected device of claim 15, wherein the one or more sensor devices comprise one or more selected from a group comprising:

microphones; and, motion sensors.

19. The connected device of claim 15, wherein the one or more connected devices further comprise one or more output devices, and wherein the one or more computing devices are configured to provide the notification via the one or more output devices.

20. The connected device of claim 15, wherein the one or more output devices comprise one or more speakers.

* * * * *